(12) United States Patent
Kitamura et al.

(10) Patent No.: US 6,658,541 B2
(45) Date of Patent: Dec. 2, 2003

(54) COMPUTER SYSTEM AND A DATABASE ACCESS METHOD THEREOF

(75) Inventors: Manabu Kitamura, Yokohama (JP); Koji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 09/822,273

(22) Filed: Apr. 2, 2001

(65) Prior Publication Data

US 2002/0059324 A1 May 16, 2002

(30) Foreign Application Priority Data

Oct. 25, 2000 (JP) .......................................... 2000-332107

(51) Int. Cl.[7] .............................................. G06F 12/00
(52) U.S. Cl. ..................... 711/162; 711/161; 711/165; 714/6; 707/8; 707/204
(58) Field of Search ................................. 711/161, 162, 711/165; 714/6; 707/204, 8

(56) References Cited

PUBLICATIONS

Oracle8 Architecture, Chapter 10—Database Protection, pp. 1–8. Aug. 18, 1997.

*Primary Examiner*—Donald Sparks
*Assistant Examiner*—Mehdi Namazi
(74) *Attorney, Agent, or Firm*—Mattingly, Stanger & Malur, P.C.

(57) ABSTRACT

A database update method for a computer system having a host computer and a storage sub-system where a database is maintained is disclosed. The storage sub-system includes first and second storage units containing duplicated data. The host computer accesses the first storage unit for data reading and the second storage unit for data writing. If incomplete processing to read is in process when an access request for data writing occurs, the host computer commands the stop of volume duplication of the first and second storage units and issues a write request. In response to this command, data is stored into only the second storage unit. Upon the completion of both read and write processing, the host computer commands the restart of volume duplication of the first and second control units to reflect the data stored into the second storage unit in the first storage unit.

11 Claims, 13 Drawing Sheets

| SEQUENCE NO. | STARTING LBA | NUMBER OF BLOCKS | STARTING ADDRESS OF CACHE AREA | ENDING ADDRESS OF CACHE AREA |
|---|---|---|---|---|
| 1 | 0x10000 | 0x10020 | 0x50000000 | 0x50004000 |
| 2 | 0x20000 | 0x20020 | 0x60000000 | 0x60004000 |
| 3 | ....... | ....... | ........ | .......... |
| 4 | ....... | ....... | ........ | .......... |
| ... | ....... | ....... | ........ | .......... |

FIG. 11

| | | 402 | 403 | 404 | 405 |
|---|---|---|---|---|---|
| 0 | SEQUENCE NO. | STARTING LBA | NUMBER OF BLOCKS | STARTING ADDRESS OF CACHE AREA | ENDING ADDRESS OF CACHE AREA |
| | 1 | 0x10000 | 0x10020 | 0x50000000 | 0x50004000 |
| | 2 | 0x20000 | 0x20020 | 0x60000000 | 0x60004000 |
| | 3 | ....... | ....... | .......... | .......... |

| | | | | | |
|---|---|---|---|---|---|
| 1 | SEQUENCE NO. | STARTING LBA | NUMBER OF BLOCKS | STARTING ADDRESS OF CACHE AREA | ENDING ADDRESS OF CACHE AREA |
| | 1 | 0x10000 | 0x10020 | 0x50000000 | 0x50004000 |
| | 2 | 0x20000 | 0x20020 | 0x60000000 | 0x60004000 |
| | 3 | ....... | ....... | .......... | .......... |

| | | | | | |
|---|---|---|---|---|---|
| 2 | SEQUENCE NO. | STARTING LBA | NUMBER OF BLOCKS | STARTING ADDRESS OF CACHE AREA | ENDING ADDRESS OF CACHE AREA |
| | 1 | 0x10000 | 0x10020 | 0x50000000 | 0x50004000 |
| | 2 | 0x20000 | 0x20020 | 0x60000000 | 0x60004000 |
| | 3 | ....... | ....... | .......... | .......... |

COMPUTER SYSTEM AND A DATABASE ACCESS METHOD THEREOF

FIELD OF THE INVENTION

The present invention relates a method of inquiry of a database system, particularly to such method that is useful for high-speed processing of a plurality of concurrent transactions.

BACKGROUND OF THE INVENTION

Online transaction systems are widely used for such processing that a plurality of concurrent requests for processing are to be accepted, for example, bank account processing and airline's processing for airline ticket booking.

The online transaction systems are required to return consistent data even if a plurality of requests occur simultaneously. For example, suppose that a part of a database is being read by the request of a user (first user), while another user (second user) issues a request to update the same data part. In this case, the data to be read by the request from the first user must be read before being updated by the request from the second user. If the data update by the request from the second user is executed when the request is accepted, there is a possibility of the data being rewritten before being read by the request from the first user. Therefore, the system locks the data to be read by the read request from the first user when it accepts this request and lets the data update request from another user waiting until the completion of the data reading by the request from the first user.

Actions to be executed by request from users are called transactions. The online transaction system controls the transactions to avoid contention between the transactions and reading or writing of inconsistent data. The above-mentioned online transaction processing method based on the conventional art poses some problem. If rather long processing time is required for data reading by the request from the first user as, for example, sizable data is read, the data write by the request from the second user must be let waiting until the completion of the data reading by the request from the firs user. Consequently, it takes considerable time to process the request form the second user.

To solve such problem, some database management systems (hereinafter abbreviated to DBMS) use a technique called multi-versioning. Explanation about the multi-versioning is found in a reference, for example, ORACLE8Architecture (Shoeisha) p. 206. This technique permits the data write by the request from the second user to be executed even before the completion of data reading by the request from the first user. If it is required that data of the request from the first user be read from the area where data has been written by the request from the second user, the old data prior to the time when the data write was executed by the request from the second user is recovered by using the rollback segments of the database and transferred to the first user. This processing method eliminates the problem that the processing of one transaction interferes with the processing of another transaction.

SUMMARY OF THE INVENTION

The previous technique stated above makes it possible to execute a plurality of transactions concurrently by the multi-versioning. However, the DBMS is responsible for performing all operations including data recovery and this increases the load on the host computer, resulting in long processing time for each transaction. In addition, so large area cannot be allocated for rollback segments, which poses a problem that the multi-versioning method is not suitable for sizable data update processing.

An object of the present invention is to provide a method of enabling efficient processing of concurrent transactions without increasing the load on the system when a plurality of requests for processing through the access to same data area are issued simultaneously.

A computer system of the present invention, which is embodied in preferable mode, includes a host computer for executing transaction processing and a storage sub-system connected to the host computer and furnished with a first storage unit where a database to be accessed for transaction processing is stored and a storage control unit that controls the access to the first storage unit, according to the request from the host computer.

When the host computer issues a write request for database update to the disk sub-system, it checks to see whether incomplete processing to read data from the database is in process. If incomplete read processing is in process, the host computer commands the disk sub-system not to write the data into the first storage unit immediately after receiving the write request to be issued and issues the write request to the disk sub-system.

In response to the write request, the disk sub-system stores the data that is eventually to be written into the database into a second storage which is different from the first storage unit and notifies the host computer of processing complete.

After the completion of both incomplete read processing and write processing, the host computer commands the disk sub-system to write the data into the first storage unit. In response to this command, the disk sub-system writes the data that has been written into the second storage unit but not written into the first storage unit into the first storage unit.

In one mode of implementing the invention, the first storage unit and the second storage unit are disk units controlled to contain same duplicated data by the storage control unit. In normal operation state, the host computer specifies the first storage unit when issuing a command to read data from the database and the second storage unit when issuing a command to write data into the database. The storage control unit reflects the data written into the second storage unit in the first storage unit.

When the storage control unit is commanded not to write data into the first storage unit from the host computer, it temporarily stops the reflection of the data written into the second storage unit in the first storage unit. When the storage control unit is commanded to write data into the first storage unit, it copies the unduplicated data from the second storage unit to the first storage unit so that both storage units will contain the same data. In this way, the storage control unit controls the storage units so that the data written into the second unit will be reflected in the first storage unit.

In another mode of implementing the invention, the second storage unit is a cache memory under the control of the storage control unit. When the storage control unit is commanded not to write data into the first storage unit from the host computer, it stores the data to write into the second storage unit in response to a write request that specifies that data is written into the first storage unit, and then notifies the host computer of processing complete. When the storage control unit is commanded to write data into the first storage unit from the host computer, it retrieves the data retained in the second storage unit, but not written into the first storage unit, from the second storage unit and writes it into the first storage unit.

Other and further objects, features and advantages of the invention will appear more fully from the following description.

BRIEF DESCRIPTION OF THE DRAWINGS

A preferred form of the present invention is illustrated in the accompanying drawings in which:

FIG. 11 shows an example of the logical structure of cache memory management tables;

DESCRIPTION OF THE PREFERRED EMBODIMENTS

Figure 1:
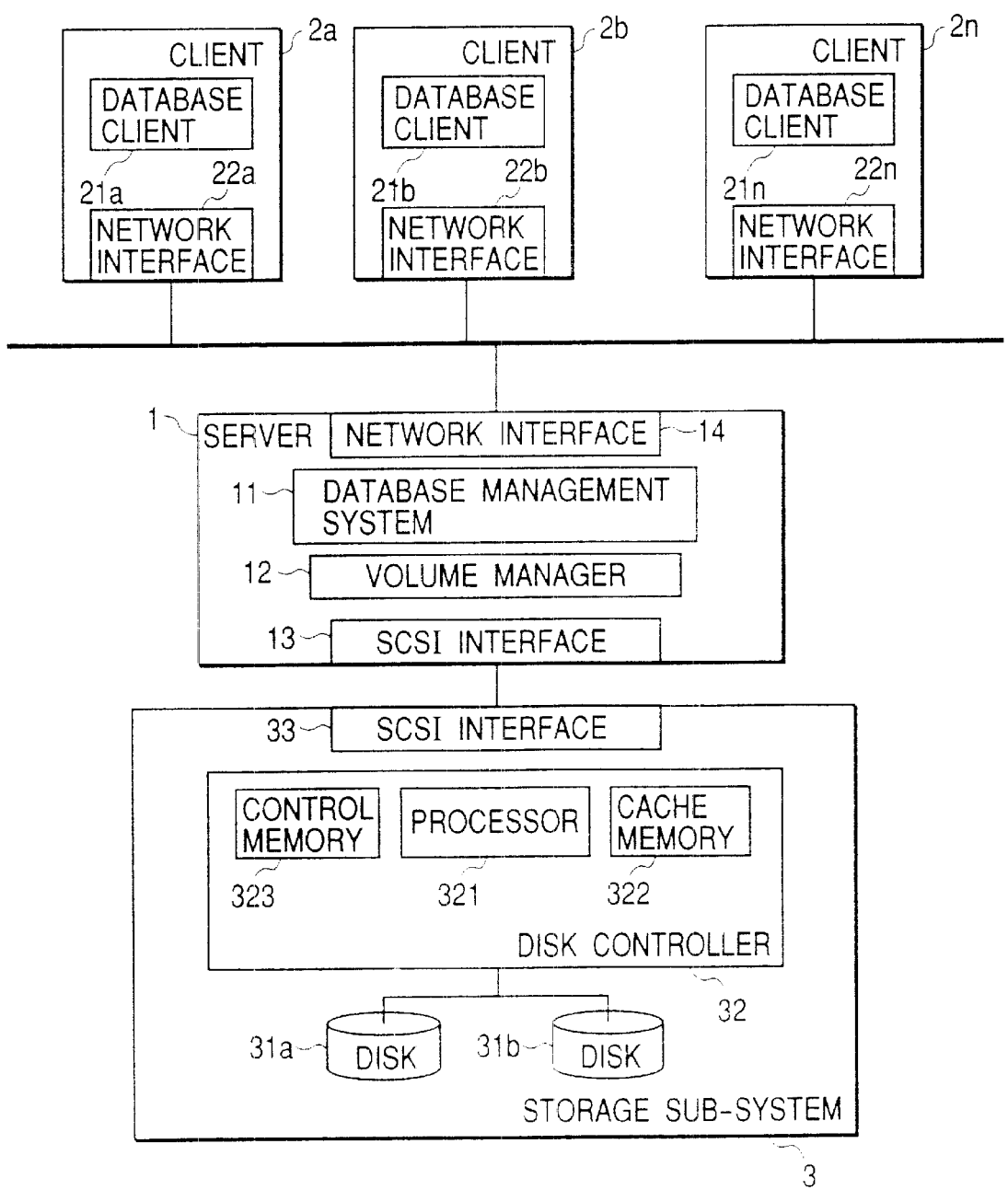
FIG. 1 is a block diagram schematizing the configuration of a computer system to which the present invention is applied, which is configured as a preferred Embodiment 1 of the invention.

FIG. 1 is a block diagram schematizing the configuration of a computer system to which the present invention is applied, which is configured as a preferred Embodiment 1 of the invention.

The computer system of Embodiment 1 has a server 1, a plurality of client computers 2a, 2b, ... 2n (all of which are referred to as clients 2), and a storage sub-system 3 connected to the server 1.

The server 1 includes a SCSI interface 13 for making the connection to the storage sub-system 3, a network interface 14 for making the connection to the clients 2, a database management system 11, and a volume manager 12. The server 1 is a so-called computer such as a PC or a workstation on which the server software runs and also includes a CPU, memory and other peripheral devices which are, however, not shown. The database management system 11 and the volume manager 12 are program implementations that are loaded in memory and executed by the CPU. The volume manager 12 may be implemented as a program assembled into the database management system 11 software.

The clients 2 each include network interfaces 22a, 22b, 22c, ... 22n, respectively (all of which will be referred to as network interfaces 22 hereinafter) and database clients 21a, 21b, ... 21n, respectively (all of which will be referred to as database clients 21 hereinafter). As is the case with the server, the clients 2 are computers such as PCs or workstations on which client software runs and also include a CPU and memory which are, however, not shown. The database clients 21 are program implementations that are loaded in memory and executed by the CPU.

The database management system 11 is responsible for handling of the access to the data stored in the storage sub-system 3. The database clients 21 issue a request for processing to the database management system and accesses required data.

The storage sub-system 3 includes disk units 31a and 31b, a disk controller 32, and an interface 33 for making the connection to the server 1. Although a database generally has a number of disks where data is stored, the database data in the case of Embodiment 1 is assumed to be stored into two disk units 31a and 31b for the purpose of simplifying the explanation of the invention. The disk units 31a and 31b are assumed to have same capacity.

The disk controller 32 has a processor 321, a cache memory 322, and a control memory 323.

In order to speed up the processing of access from the host computer (server 1 in this context), the cache memory 322 is to store data to be read frequently or temporarily store data to write received from the host computer. To prevent the stored data from being lost by trouble such as power interruption, battery backup measures should be taken for the cache memory 322 or a nonvolatile memory such as a flash memory should be used as the cache memory 322.

The processor 321 is responsible for the processing of an access request from the host computer and the control of the cache memory 322. The control programs for these processing and control requirements are installed in the control memory 323. The disk units 31a and 31b are not necessarily single units of magnetic disk drives, but may be logical disk storage units which are apparently a single disk drive or a plurality of disk drives consisting of a plurality of physical disk drives such as disk arrays.

The disk controller 32 controls the disk units 31a and 31b so that the disk units can be accessed from the server 1 as independent single units. However, the access to the disk unit 31b from the server 1 is enabled for read only.

The disk controller 32 has a volume duplicating function to maintain two or more disk units containing same data. For example, if the disk units 31a and 31b are set in the duplication mode, when the disk controller 32 receives a request to write data into the disk unit 31*a* from the server 1, it writes the data into the disk unit 31*a* and at the same time it writes the same data into the disk unit 31*b* as well. Setting the volume duplicating function ON/OFF is controlled by a command issued from the volume manager 12 of the server 1 and delivered to the disk controller 32 via the SCSI interfaces 13 and 33. When the disk controller 32 is commanded to set the volume duplicating function OFF by the volume manager 12, it stops reflecting the data into the disk unit 31*b*. Thereby, the disk unit 31*b* retains the data stored into it before the execution of the command to set the volume duplicating function OFF. When the disk controller 32 is commanded to set the volume duplicating function ON, it copies the unduplicated data which have been written into the disk unit 31*a* after that function is set OFF to the disk unit 32*b*. Then, the disk unit 31*a* and the disk unit 32*b* contain the same data.

Figure 2:
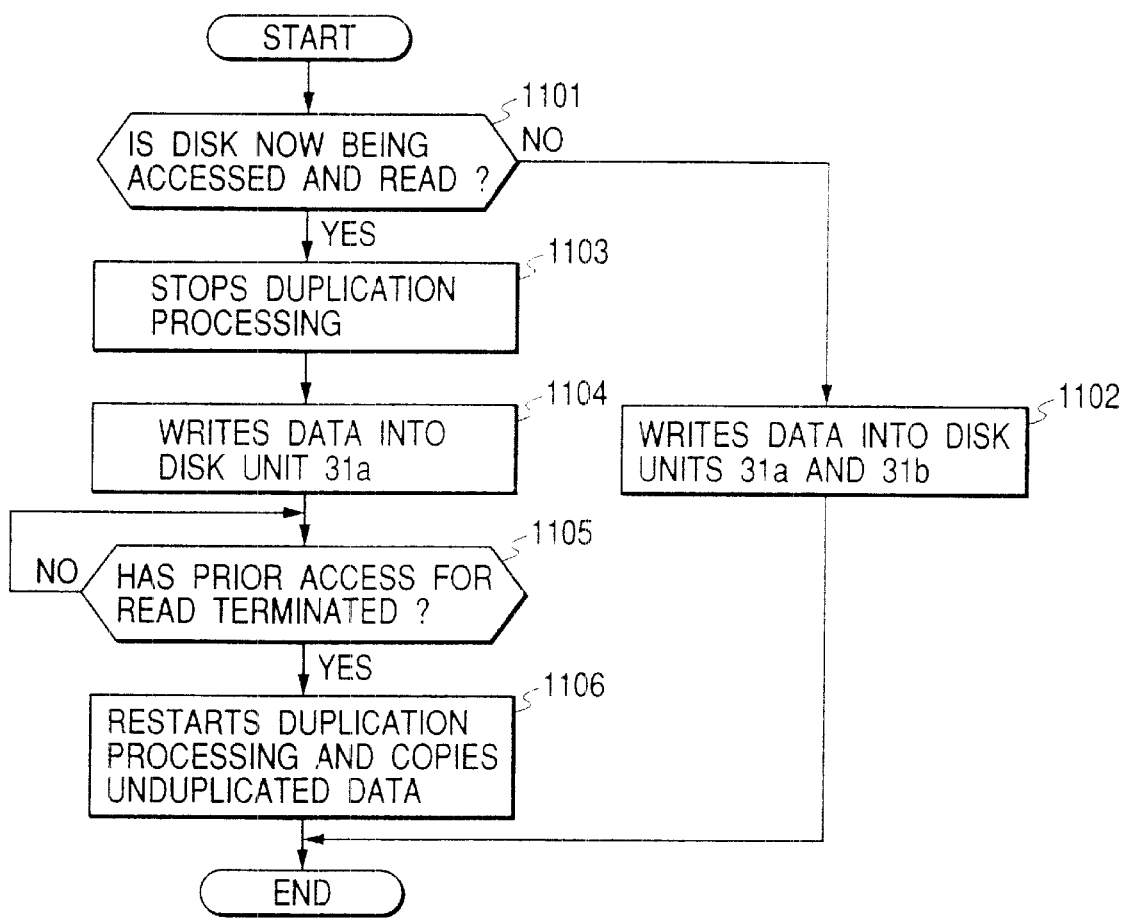
FIG. 2 is a flowchart illustrating how the database management system operates for processing when the server receives a request to update the data that is being read by a prior request during the access to the database for data read.

FIG. 2 is a flowchart illustrating how the database management system 11 operates for processing when the server 1 receives a request to update the data that is being read by a prior request during the access to the database for data read.

In Embodiment 1, when the database management system 11 receives a read request for data search from a database client 21, it accesses the disk unit 31*b* and retrieves the data of request.

When a data update request is issued from a database client 21, the database management system 11 checks to see whether the disk unit 31*b* is now being accessed and read (step 1101). If the disk is not accessed and read now, the database management system 11 writes the data specified in the update request statement into both the disk units 31*a* and 32*b* by means of the volume duplicating function, thus carrying out the data update (step 1102).

If the disk is now being accessed and read, which is detected in the step 1101, the database management system 11 stops the duplication processing of the disk units 31*a* and 31*b* by using the volume manager 12 (step 1103). Following this step, the database management system 11 updates the data in the disk unit 31*a* as specified in the update request statement (step 1104).

After the data update, the database management system 11 checks to see whether the prior access for data reading, which was initiated before the update request, has terminated; unless the prior access for data reading has terminated, the DBMS is awaiting its termination (step 1105). If the prior access for data reading has terminated, the database management system 11 restarts the duplication processing of the disk units 31*a* and 31*b* through the volume manager 12 and copies the unduplicated data from the disk unit 31*a* to the disk unit 31*b* (step 1106).

According to Embodiment 1, a plurality of access requests to the database can be processed without the occurrence of a significant increase of the load on the database management system.

Figure 3:
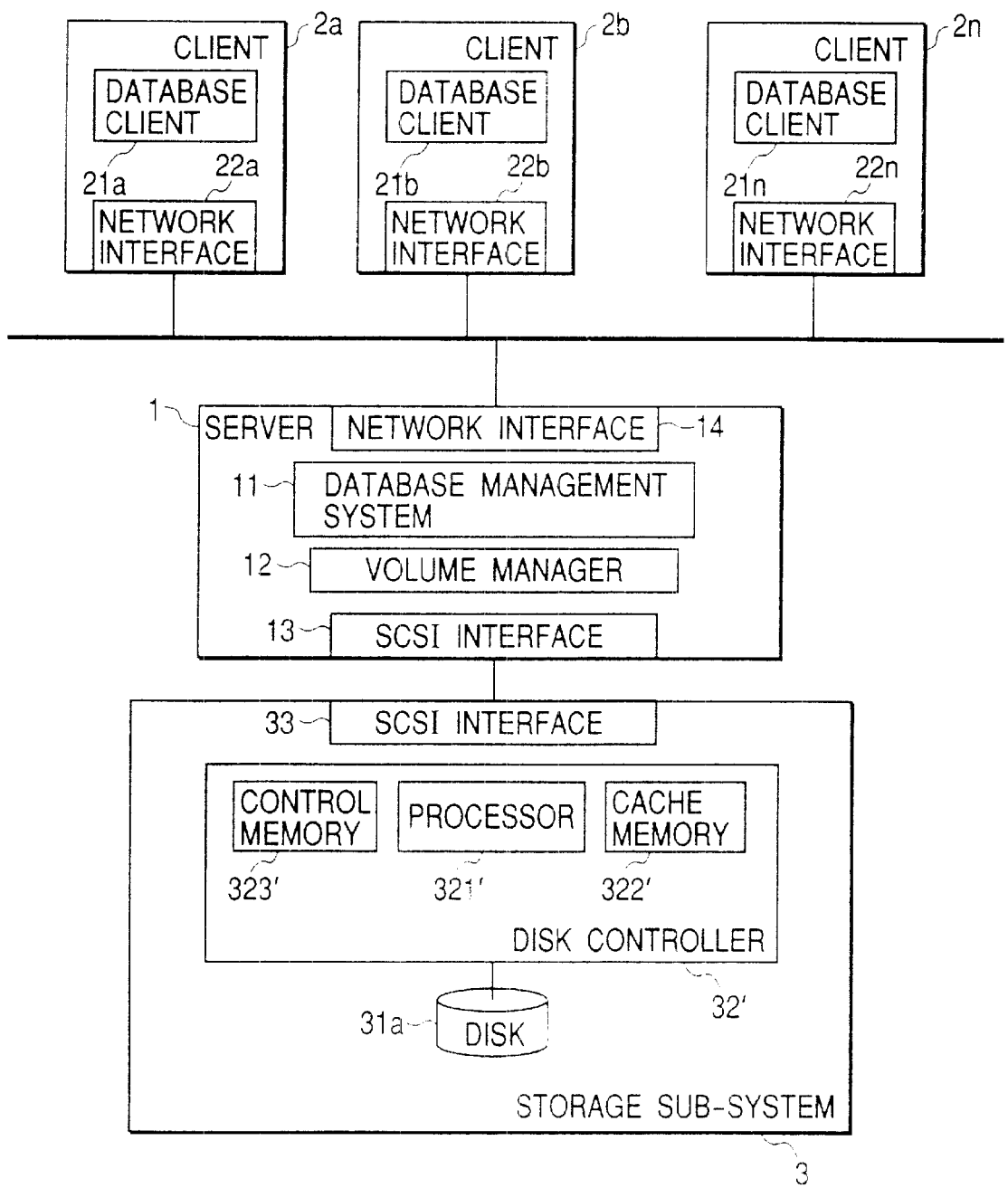
FIG. 3 is a block diagram schematizing the configuration of a computer system to which the present invention is applied, which is configured as a preferred Embodiment 2 of the invention.

FIG. 3 is a block diagram schematizing the configuration of a computer system to which the present invention is applied, which is configured as a preferred Embodiment 2 of the invention. The computer system of Embodiment 2 is substantially the same as the computer system of Embodiment 1, except that the function of the disk controller 32' is somewhat different from that of the disk controller 32 in the Embodiment 1 system. In the following, the difference of Embodiment 2 from Embodiment 1 will be mainly explained.

In Embodiment 2, when the disk controller 32' receives a "temporary write inhibit" request from the server 1, it comes to function as follows: when it receives any write request issued from the server thereafter, it temporarily stores the data of write request into the cache memory 322' and completes processing without actually writing that data into the disk unit.

The data stored into the cache memory 322' is retrieved therefrom and written into the disk unit 31 when the server issues a request indicating "write release from inhibition." When the disk controller 32' receives the request indicating "write release from inhibition," it returns to normal operation; whenever it receives a write request thereafter, it writes data of request into the disk unit 31*a*.

Figures 4, 5:
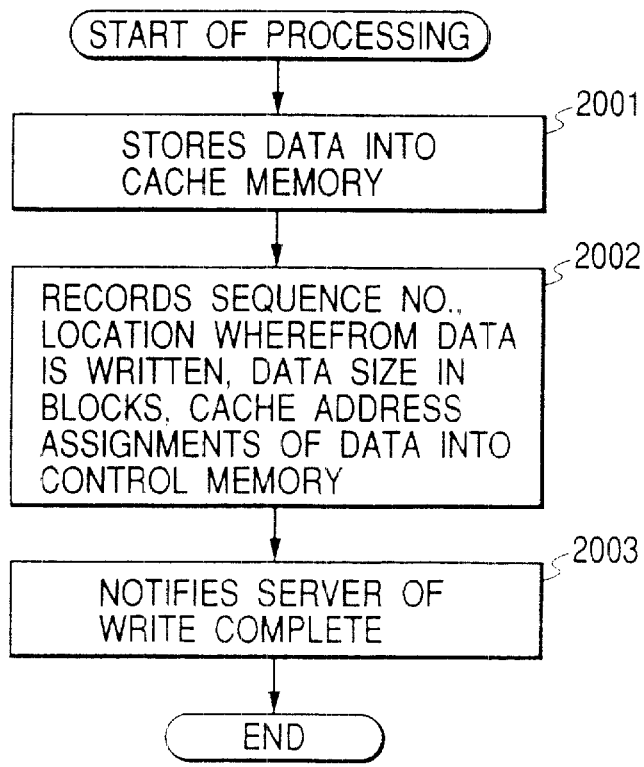
FIG. 4 shows an example of the logical structure of a cache memory management table.
FIG. 5 is a flowchart illustrating the flow of processing of write request when the storage sub-system is set in the "temporary write inhibit" state.

FIG. 4 shows the logical structure of a cache memory management table 400 to be retained in the control memory 323'.

The cache memory management table 400 is to retain information required for later retrieving the temporarily stored data from the cache memory 322' and writing it into the disk unit 31*a*. This information has the sequence number of data, Starting LBA, the number of blocks, the starting address and ending address of the cache area into which the data has been stored. To contain the above information, the table has these entries: sequence No. 401, Starting LBA 402, number of blocks 403, starting address of cache area 404, and ending address of cache area 405.

The sequence number is a serial number indicating the place of the data in order in which data is to be written by write request from the server 1. The sequence number is not necessarily the serial number, but may be information, based on which the disk controller 32' can find what place of each data to be written in order. For example, time at which a write request of data was received can be used instead of the serial number of the data.

The Starting LBA is a Logical Block Address (LBA) of disk from which data is written into the disk unit 31*a* by write request from the server 1. The number of blocks indicates the size of data to be written by write request (the number of blocks on the disk unit 31*a*).

The starting address and ending address of cache area indicate the starting address and ending address of the area of cache memory 322' where data is temporarily retained.

When the disk controller 32' receives a "write release from inhibition" command, it first retrieves data of the lowest sequence number (for the oldest write request it accepted) from the cache memory and writes it into the disk unit 31*a,* and sequentially does for remaining data of the next lowest sequence number. By thus writing cached data into disk unit 31*a* in sequence number order, the sequential consistency of the data to write can be ensured.

FIG. 5 is a flowchart illustrating the flow of processing of write request when the storage sub-system 3' is set in the "temporary write inhibit" state.

After the disk controller 32' accepts the "temporary write inhibit" request from the server 1, when it receives a write request from the server 1, it stores the data to write specified in the write request statement received from the server 1 into the cache memory 322'. At this time, the disk controller 32' acquires cache memory addresses of free area in the cache memory 322' by referring to the cache memory management table 400. Then, the disk controller 32' allocates the area specified by the acquired cache memory addresses for storing the data to write (step 2001).

Into the cache memory management table 400, the disk controller 32' then records the sequence number of the data to write, LBA wherefrom the data is written, the number of blocks of disk allocated for the data, the starting and ending cache memory addresses of the area into which the data has been stored (step 2002). If no information exists in the sequence No. 401 column of the cache memory management table 400, the data to write is assigned 0 as its sequence number; the next data to write is assigned a sequence number incremented by one. If, for example, four entries exist in the table as shown in FIG. 4, when a write request is accepted, the data of write request is assigned sequence number 5.

After the above processing, the disk controller 32' notifies the server 1 of write processing complete (step 2003). Then, the processing terminates without writing the data into the disk unit 31a as described above.

Figure 6:
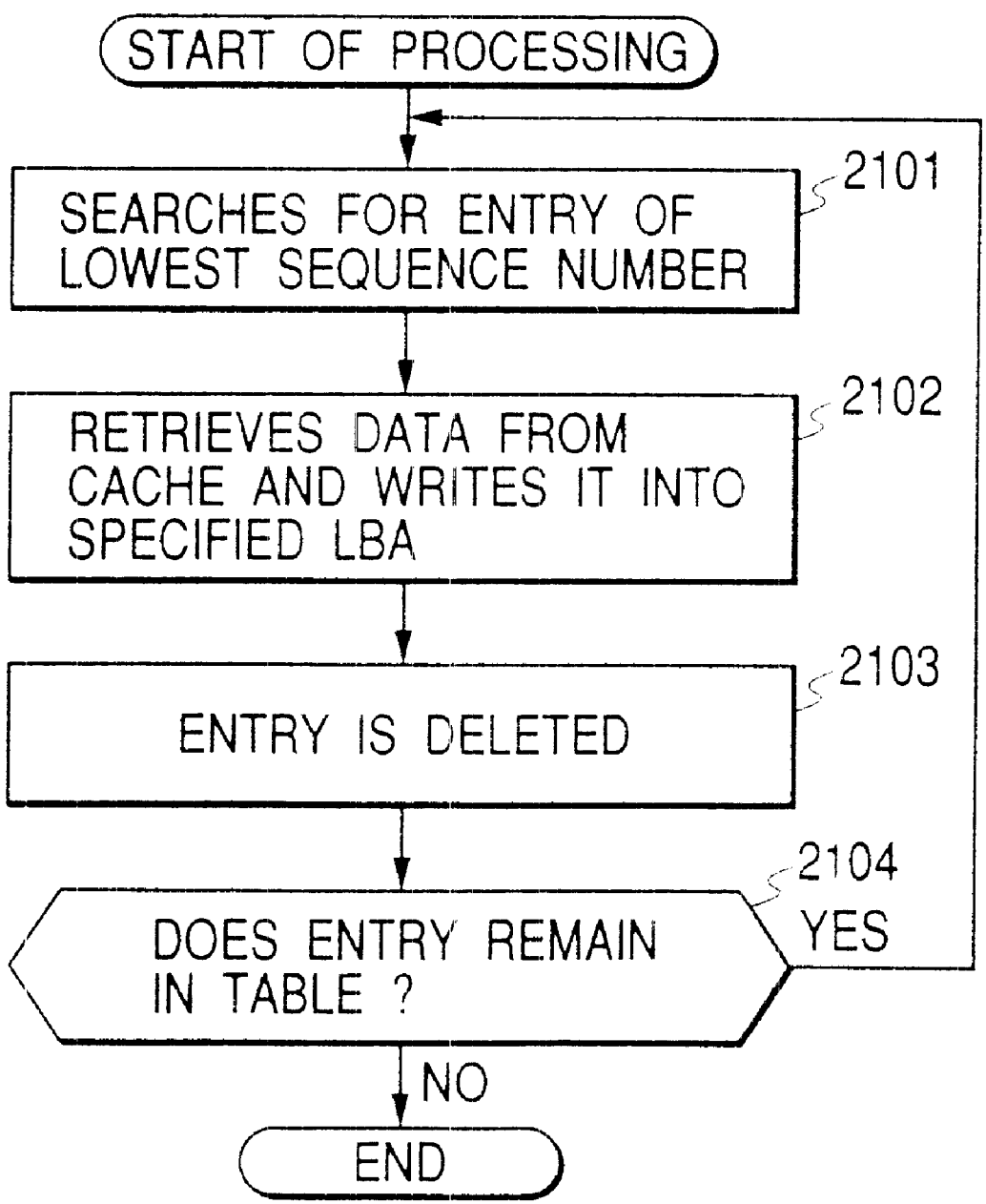
FIG. 6 is a flowchart illustrating the flow of processing to be carried out when the storage sub-system accepts the "write release from inhibition" request from the server.

FIG. 6 is a flowchart illustrating the flow of processing to be carried out when the storage sub-system 3' accepts the "write release from inhibition" request from the server 1.

When the disk controller 32' receives the "write release from inhibition" request, it searches the cache memory management table 400 for the entry of the lowest sequence number in the sequence No. 401 column (step 2101). With reference to the sequence number entry searched out in the step 2101, the disk controller 32' then retrieves the data stored in the cache memory 322' area located by the information contained in the fields of starting address of cache area 404 and ending address of cache area 405 and writes it into the disk unit 31a, according to the information contained in the fields of Starting LBA 402 and the number of blocks 403 (step 2102).

The sequence number entry searched out in the step 2101 and related management data are deleted from the cache memory management table 400 upon the completion of writing the above data into the disk unit 31a (step 2103). Then, the disk controller 32' checks to see whether unprocessed entry remains in the cache memory management table 400 (step 2104). If unprocessed entry remains in the cache memory management table 400, the disk controller 32' repeats the step 2101 and subsequent steps. When all entries of the table have been processed with no unprocessed entry existing, the processing terminates.

Figure 7:
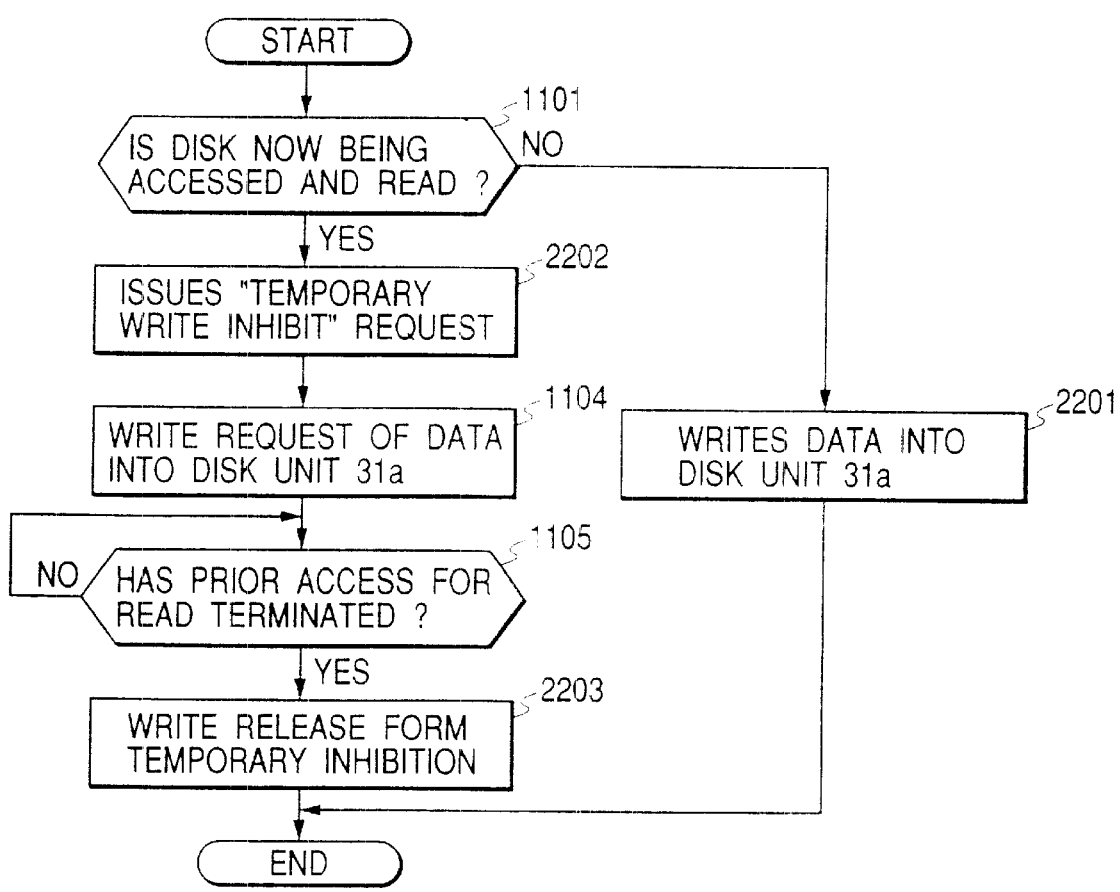
FIG. 7 is a flowchart illustrating how the database management system operates for processing when the server receives a request to update the data that is being read by a prior request during the access to the database for data read.

FIG. 7 is a flowchart illustrating how the database management system 11 of Embodiment 2 operates for processing when the server receives a request to update the data that is being read by a prior request during the access to the database for data read. Some steps in FIG. 7 correspond to the steps illustrated in FIG. 2; for these steps, the same reference numbers are used as assigned to the steps in FIG. 2.

When receiving a data update request issued from a database client 21, the database management system 11 checks to see whether the disk is now being accessed and read (step 1101). If the disk is not accessed and read now, the database management system 11 issues a write request to the storage sub-system 3' to write the data of write request into the disk unit 31a (step 2201).

If the disk is now being accessed and read, which is detected in the step 1101, the database management system 11 issues a "temporary write inhibit" request to the storage sub-system 3' (step 2202). Following this, the database management system 11 issues a data write request in accordance with the update request from the database client 21 to the storage sub-system 3'. The write request may be issued two or more times if the occasion arises. At this time, on the storage sub-system 3' side, the processing illustrated in FIG. 5 is carried out. Specifically, in response to the write request from the database management system 11, the data to write is stored into the cache memory 322', when the processing of the storage sub-system is completed, but the data to write remains unwritten into the disk unit 31a (step 1104).

Upon the reception of the write complete notification from the storage sub-system 3', the database management system 11 checks to see whether the prior access for data reading, which was executed before the update request, has terminated (step 1105). If the prior access for data reading has terminated, the database management system 11 commands "write release from inhibition" to the storage sub-system 3', when the processing terminates (step 2203).

Figure 8:
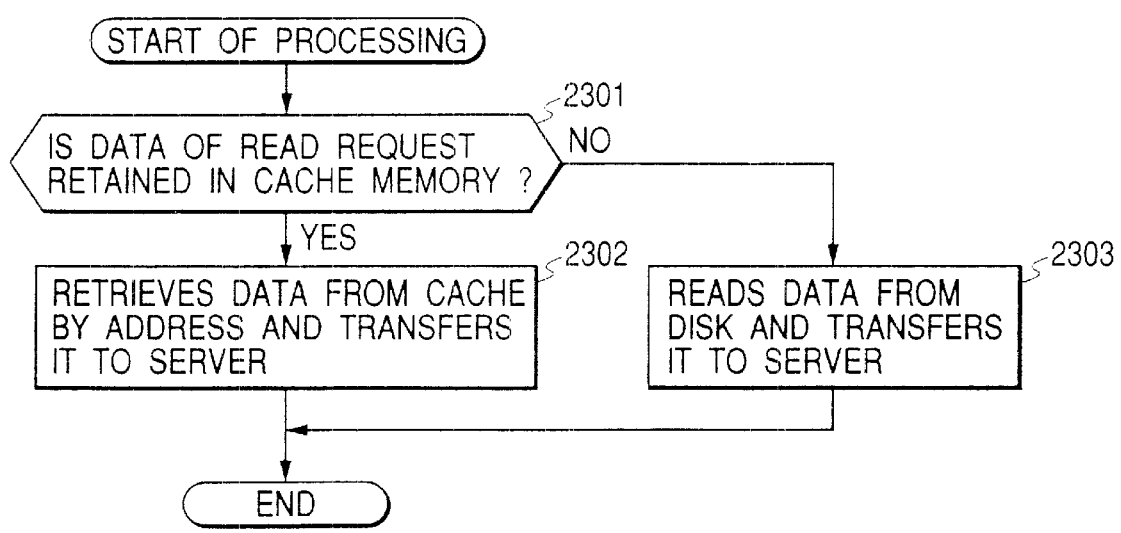
FIG. 8 is a flowchart illustrating the flow of processing to be carried out when the storage sub-system accepts a read request from the server during the transfer of data from the cache memory to the disk unit.

In response to the "write release from inhibition" command issued in the step 2203, the storage sub-system 3' carries out the processing illustrated in FIG. 6; i.e., it retrieves the data to write, retained in the cache memory 322' after stored in the step 1104, and writes it into the disk unit 31a. If another data read request from the server 1 occurs during the write of the data into the disk unit 3a from the cache memory 322', requesting that data be read from the area into which data is being written, the disk controller 32' of the storage sub-system 3' carries out the processing which is illustrated in FIG. 8.

In response to the read request from the server 1, the disk controller 32' checks to see whether the data of read request is retained in the cache memory 322' by referring to the cache memory management table 400 in the control memory 323' (step 2301). If that data is retained in the cache memory 322', the disk controller 32' retrieves the data from the cache memory 322' and transfers it to the server 1 (step 2302). If it is judged that the data is not retained in the cache memory 322' in the step 2301, the disk controller 32' reads the data from the disk unit 31a and transfers it to the server 1 (step 2303).

According to Embodiment 2, unlike Embodiment 1, the database management system 11 always accesses the disk unit 31a when accessing data in the database data. During the processing to make the disk units contain the same data (step 1106) in Embodiment 1 to be performed after the completion of data update processing, a request to read the data from the area where data update is in process cannot be accepted. Even for the corresponding case in Embodiment 2, by carrying out the processing illustrated in FIG. 8, data in the database can be referenced even during the process execution following the write release from inhibition.

Figure 9:
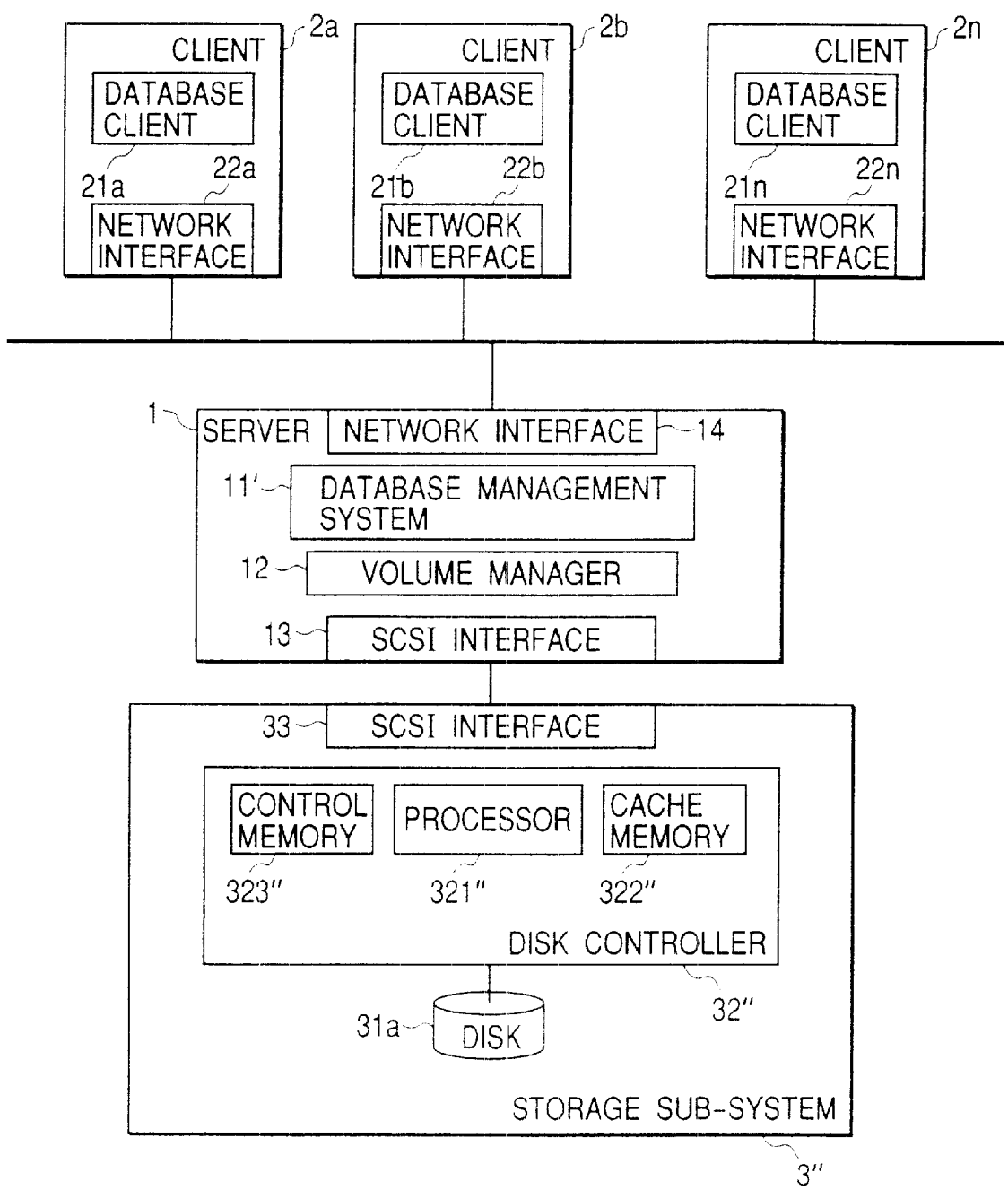
FIG. 9 is a block diagram schematizing the configuration of a computer system to which the present invention is applied, which is configured as a preferred Embodiment 3 of the invention.

FIG. 9 is a block diagram schematizing the configuration of a computer system to which the present invention is applied, which is configured as a preferred Embodiment 3 of the invention. The system of Embodiment 3 is physically configured the same as Embodiments 1 and 2. Embodiment 3 differs from Embodiments 1 and 2 in the I/O commands such as read and write to be issued from the database management system 11' and the function of the disk controller 32", as will be explained below.

The database management system 11' of Embodiment 3 issues extended commands of normal read/write commands as read/write requests when accessing the disk unit 31a. In the normal read/write commands, LBA to indicate a write location on the disk unit 31a and the number of blocks to be allocated for data to write are specified. In the read/write commands used for Embodiment 3, transaction ID is specified in addition to the above information. Transaction ID is a unique identification number that is assigned to each transaction of serial actions to be handled by the database management system 11'. Read/write commands that occur during a same transaction include the same transaction ID specified.

The transaction ID is used for the internal controller of the storage sub-system 3" to identify what transaction to which the I/O commands received are related. Thus, the transaction ID content may be any value that can identify each transaction. As applied in the present Embodiment 3, transaction IDs are non-negative integers with the initial value of 0 that is assigned to the first transaction; subsequent transactions occurring are assigned serial numbers 1, 2, 3 . . . and so on. The greater the transaction ID value, the later the transaction is executed.

Figure 10:
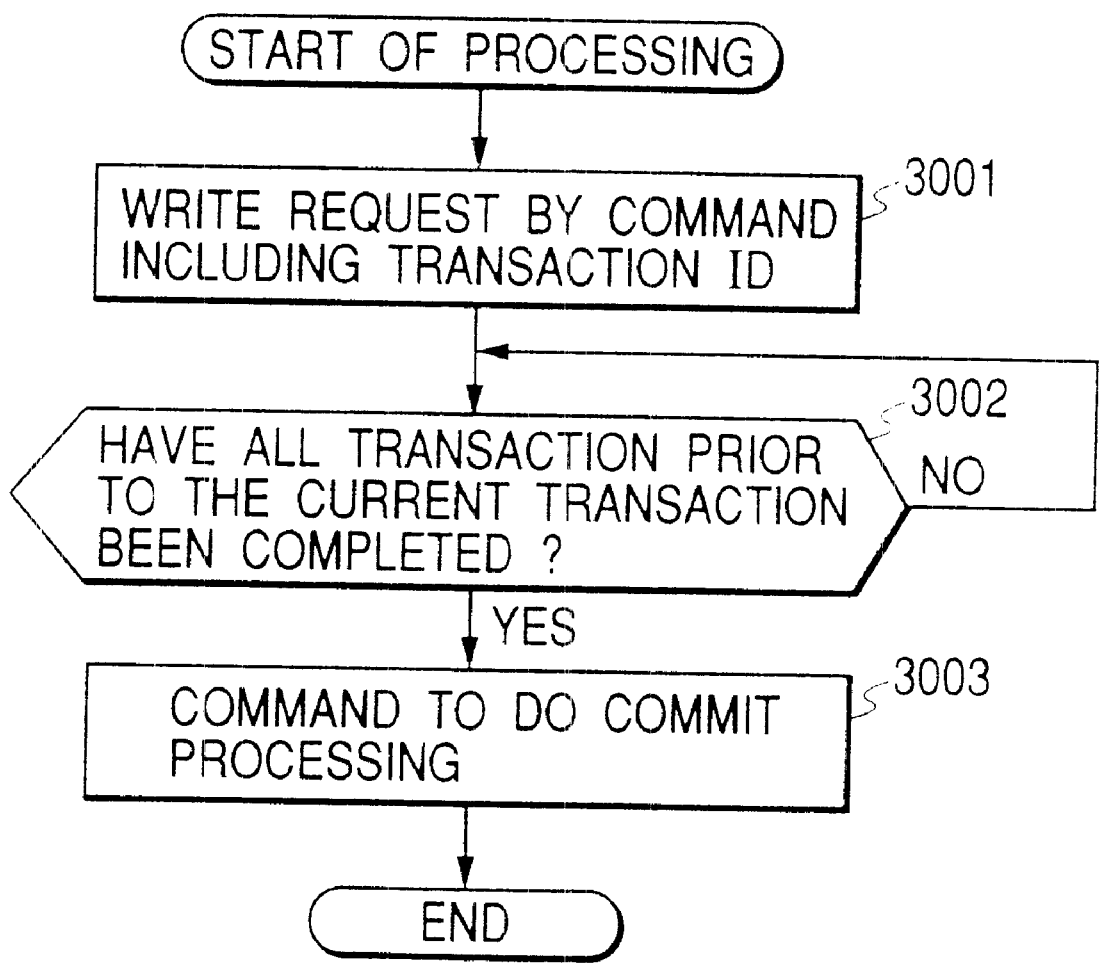
FIG. 10 is a flowchart illustrating the flow of data update processing to be carried out by the database management system of Embodiment 3.

FIG. 10 is a flowchart illustrating the flow of data update processing to be carried out by the database management system of Embodiment 3.

The database management system 11' issues a write request by command including transaction ID to the storage sub-system (step 3001). The write request may be issued two or more times, according to the transaction type. When the write processing by request has been completed, the database management system 11' checks to see whether all transactions prior to the transaction executed by completing the write processing have been completed (step 3002). If some prior transactions are not completed yet, the DBMS waits until they have been completed. If all prior transactions have been completed, the DBMS commands the storage sub-system 3" to do commit processing (step 3003). Usual storage subsystems do not support a command used for request for commit processing. Thus, in Embodiment 3, for example, the command to do commit processing is implemented by using an extended command of a MODE SELECT command for SCSI (Small Computer System Interface).

FIG. 11 shows the logical structure of cache memory management tables 400' used for Embodiment 3.

Cache memory management tables 400' for Embodiment 3 are created and managed per transaction ID. Each cache management table 400' created per transaction ID has these entries: transaction ID 410, sequence No.401', Starting LBA 402, the number of blocks 403, starting address of cache area 404, and ending address of cache area 405.

In embodiment 3, the transaction ID 410 entry field contains transaction ID information. The sequence No. 401' entry field contains a unique number assigned to data to be processed in the table created per transaction ID. Other entry fields contain the same information as specified in Embodiment 2.

Figure 12:
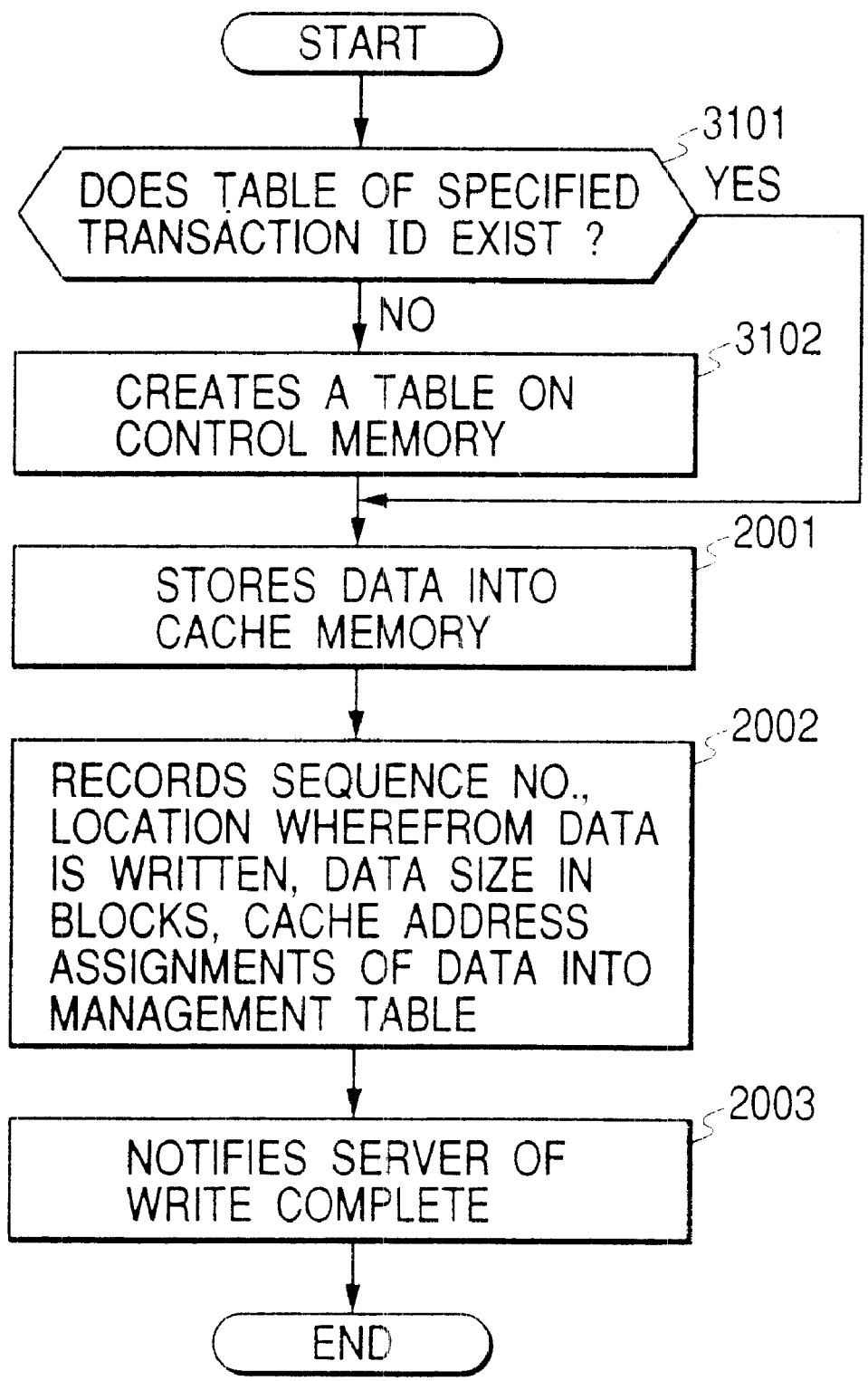
FIG. 12 is a flowchart illustrating the flow of processing to be carried out by the storage sub-system in response to a write request from the server.

FIG. 12 is a flowchart of processing to be carried out by the storage sub-system 3" in response to a write request from the server 1.

The processing illustrated in FIG. 12 corresponds to the processing illustrated in FIG. 5 for Embodiment 2. In Embodiment 3, cache memory management tables are created per transaction ID as described above. Thus, a step of creating a table to be allocated for a new transaction occurring is added to the processing illustrated in FIG. 5.

On receiving a write request issued from the server 1, the disk controller 32" of the storage sub-system 3" refers to the transaction ID included in the write request and checks to see whether the cache management table 400'of that transaction ID exists (step 3101). If such table does not exist, the disk controller 32" creates a new table and stores the specified transaction ID into the transaction ID 410 field (step 3102).

If the table exists, which is detected in the step 3101, and after the step 3102, the disk controller 32" stores the data to write into the cache memory 322" as the disk controller in Embodiment 2 does for the processing illustrated in FIG. 5 (step 2001). Into the cache memory management table 400' of the transaction ID, the disk controller 32" records the sequence number, Starting LBA, the number of blocks, the starting and ending cache memory addresses of the area into which the data has been stored (step 2002). Then, the disk controller 32" notifies the server 1 of write complete (step 2003).

Figure 13:
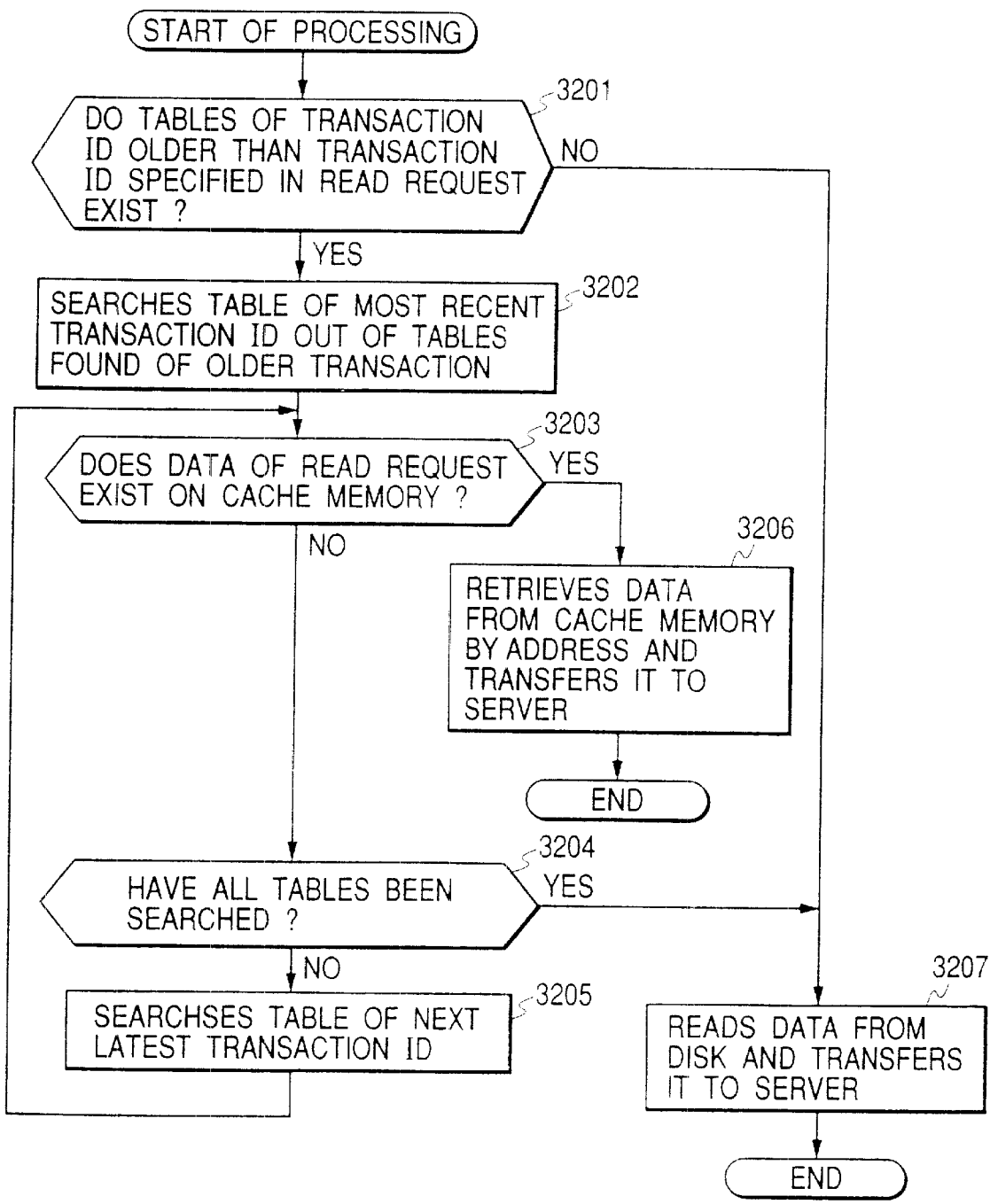
FIG. 13 is a flowchart illustrating the flow of processing to be carried out by the storage sub-system in response to a read request from the server.

FIG. 13 is a flowchart of processing to be carried out by the storage sub-system 3" in response to a read request from the server 1.

In Embodiment 3, a read request issued by the server 1 also includes transaction ID. On receiving a read request from the server 1, the disk controller 32" refers to the cache memory management tables 400' and checks to see whether the tables of transaction ID older than the transaction ID specified in the read request exist (step 3201). If such tables do not exist, the disk controller 32"reads the data of read request directly from the disk unit 31a and transfers it to the server 1, when the processing terminates (step 3207).

If such tables exist, the disk controller 32" searches the table of most recent transaction ID out of the tables found of older transaction (step 3202) and checks to see whether data area containing the data specified to read in the read request exists on the cache memory 322" (step 3203).

If such data-containing area exists on the cache memory 322", the disk controller 32" retrieves the data of read request, based on the information retained in the cache memory management table 400' of the transaction ID, and transfers it to the server 1, when the processing terminates (step 3206).

If the data of read request does not exist as the data on the cache memory managed by the table of the transaction ID searched in the step 3203, judgment is made as to whether all tables of transaction ID older than the transaction ID specified in the read request have been searched (step 3204). If there is no table of transaction ID to search, the step 3207 is executed in which the data of read request is read from the disk unit 31a and transferred to the server 1.

If there is at least a table of transaction ID that has not been searched yet, the table of the next most recent transaction ID is searched and the step 3203 and subsequent processing are repeated (step 3205).

In this way, the location of data to read is found, based on the transaction ID, and the data is retrieved and transferred to the server 1, so that consistency-maintained data can be transferred to the server 1.

Figure 14:
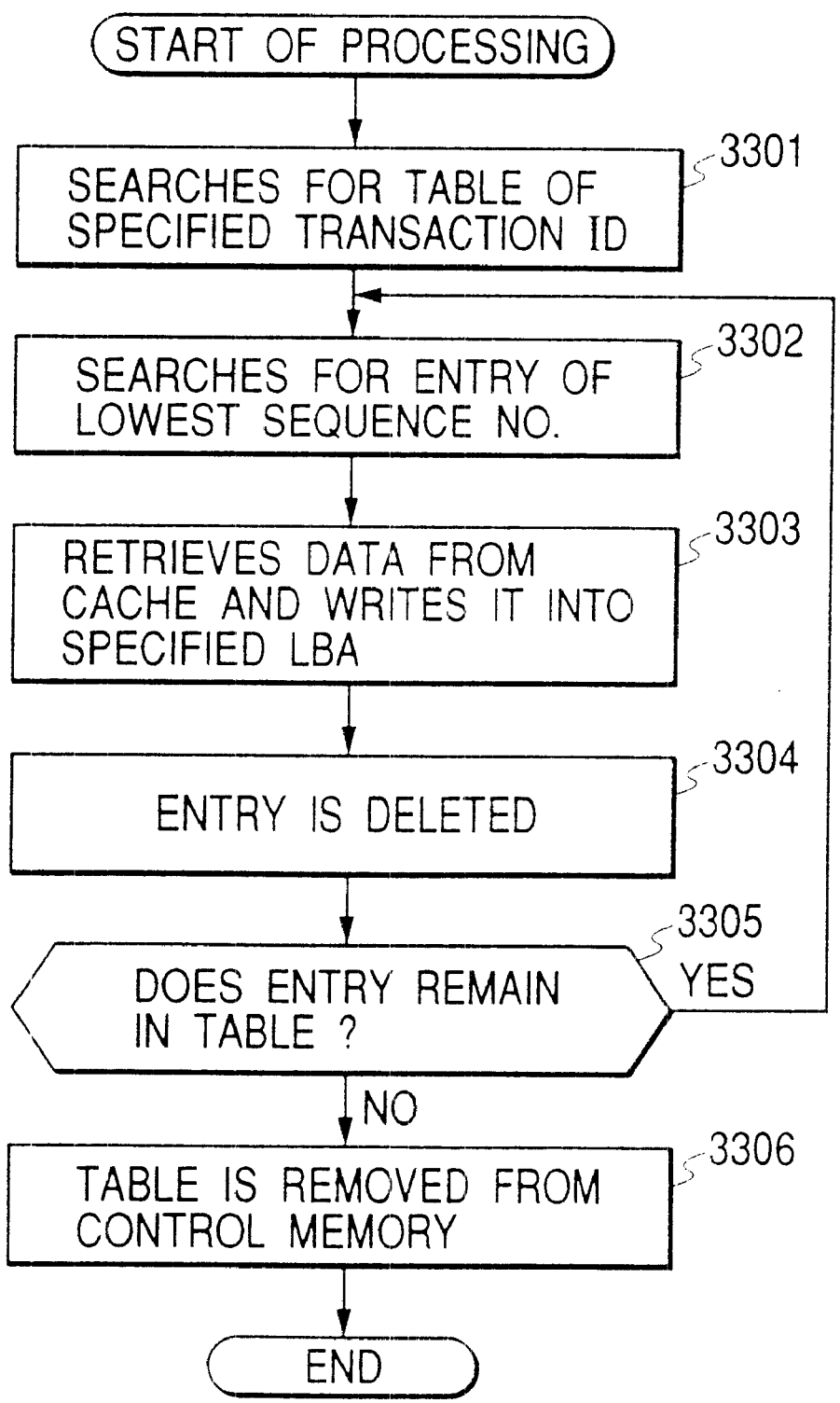
FIG. 14 is a flowchart illustrating the flow of processing to be carried out by the storage sub-system when a request for commit processing is issued from the server to the storage sub-system.

FIG. 14 is a flowchart illustrating the processing to be carried out by the storage sub-system 3" when a request for commit processing is issued from the server 1 to the storage sub-system.

When the storage sub-system 3" is commanded from the server 1 to do commit processing, the data stored into the cache memory 322" is retrieved and written into the disk unit 31a. The request for commit processing includes transaction ID as the read/write requests do. On receiving the request for commit processing, the disk controller 32" searches the cache memory management tables 400' to find a table of the transaction ID specified in the request (step 3301).

Then, the disk controller 32" searches the thus found table for the entry of the lowest sequence number in the sequence No. 401' column (step 3302). With reference to the sequence number entry searched out in the step 3302, the disk controller 32" retrieves the data stored in the cache memory 322" area located by the information contained in the fields of starting address of cache area 404 and ending address of cache area 405 and writes it into the disk unit 31a, according to the information contained in the fields of Starting LBA 402 and the number of blocks 403 (step 3303).

The disk controller 32" deletes the above entry and related management data from the table of the transaction ID upon the completion of writing the above data into the disk unit 31a (step 3304). Then, the disk controller 32" checks to see whether entry remains in the table (step 3305). If entry remains in the table, the disk controller 32" repeats the step 3202 and subsequent steps. After the completion of the above processing for all entries in the table, the disk controller 32" removes the table of the transaction ID from the control memory 323", when the processing terminates (step 3306).

It is difficult for the previously explained Embodiments 1 and 2 to process an increased number of transactions to be executed concurrently. In Embodiment 2, if transactions, for example, Read A, Write A, Read B, and Write B occur in this order, the data to write by Write A is saved on the cache memory once and written into the disk unit upon the completion of Read A. If requests for Read B and Write B transactions are issued during the write of the data to write by Write A into the disk from the cache memory, the data to write by Write B is also written into the disk unit together with the data being written by Write A. This may cause the inconsistency of the data read by Read B. Such problem arises because the storage sub-system cannot identify what transaction for which a command of request was issued from the server. In Embodiment 3, the storage sub-system can find what transaction to which any request from the server is related and such problem can be avoided.

The embodiments of the present invention explained hereinbefore are to be considered as illustrative and not restrictive. The invention may be embodied in other specific forms in the scope thereof that the attached claims define.

The foregoing invention has been described in terms of preferred embodiments. However, those skilled, in the art will recognize that many variations of such embodiments exist. Such variations are intended to be within the scope of the present invention and the appended claims.

What is claimed is:

1. A database access method for a computer system comprising
   a host computer for executing transaction processing and
   a storage sub-system, connected to the host computer, having
      a first storage unit for storing a database to be accessed for the transaction processing and
      a storage control unit for controlling the access to the first storage unit in accordance with the request from the host computer,
   the method comprising the steps of:
      judging whether incomplete processing to read data from the first storage unit is in process upon the occurrence of a data update request for the transaction processing;
      completing the write processing to the storage sub-system due to the update request by storing data to write by the update request into a second storage unit included in the storage sub-system if incomplete processing to read data is in process; and
      transferring the data to write, stored in the second storage unit, into the first storage unit after the completion of the write processing and the incomplete processing to read data.

2. The database access method according to claim 1, wherein the first storage unit and the second storage unit are duplicated storage units by means of reflecting the data written into the second storage unit in the first storage unit, and wherein
the step of completing the write processing comprises the substeps of:
   issuing a command to stop the reflection of the data written into the second storage unit in the first storage unit from the host computer to the storage sub-system; and
   issuing a write request of data relevant to the update request into the second storage.

3. The database access method according to claim 2, wherein the step of transferring data to write further comprises the substep of restarting the reflection of the data written into the second storage unit in the first storage unit.

4. The database access method according to claim 1, wherein the second storage unit is a cache memory included in the storage sub-system, and wherein the step of completing the write processing comprises the substeps of:
   issuing a command of write inhibition of data into the first storage unit from the host computer to the storage sub-system;
   issuing a write request of data relevant to the update request from the host computer to the storage sub-system; and
   storing the data into the second storage unit in response to the write request.

5. The database access method according to claim 4, wherein the step of transferring data to write comprises the substeps of:
   issuing a command of release from the write inhibition from the host computer to the storage sub-system; and
   transferring the data stored in the second storage unit into the first storage unit.

6. The database access method according to claim 5, wherein the substep of storing data further comprises
   the substep of recording information to locate storage area where the data has been stored in the second storage unit and management information to locate storage area into which the data is to be written in the first storage unit and wherein
   the step of transferring data to write is executed by referring to the management information.

7. The database access method according to claim 6, wherein
   the management information is recorded per the transaction executed on the host computer and
   the step of transferring data to write is executed each time the transaction is completed with regard to the data written during the transaction processing.

8. The database access method according to claim 7, wherein the step of transferring data to write further comprises the substeps, which are taken on the sub-system, of:
   accepting a read request from the host computer;
   determining whether the first storage unit or the second storage unit retains the data to be transferred to the host computer, based on the management information; and
   transferring the required data to the host computer, according to the result of the substep of determination.

9. A computer system comprising:
   a host computer for executing transaction processing; and
   a storage sub-system, connected to the host computer, comprising
      a first storage unit for storing a database to be accessed for transaction processing, a second storage unit for storing the copy of the database stored in the first storage unit, and a storage control unit for controlling the first and second units and duplicating the first storage unit and the second storage unit by reflecting the data written into the second storage unit in the first storage unit;

wherein the host computer comprises an access means to specify the first storage unit when reading data from the database and the second storage unit when writing data into the database, and a means to command data reflection stop and restart to judge whether incomplete processing to read data from the database is in process when writing data into the database by using the access means, command the storage sub-system to stop data reflection in the first storage unit if incomplete processing to read is in process, and restart data reflection after the completion of the incomplete processing to read and the ongoing data write processing.

10. A computer system comprising:

a host computer for executing transaction processing; and a storage sub-system, connected to the host computer, comprising a storage unit for storing a database to be accessed for transaction processing, a cache memory, and a storage control unit;

wherein the storage control unit, in addition to controlling the storage unit, behaves as follows: in response to a data write inhibit command issued from the computer, it stores data of any write request accepted after accepting the write inhibit command into the cache memory and notifies the host computer of processing complete; and in response to a write release command issued from the host computer, it transfers the data stored into the cache memory into the storage unit; and wherein the host computer judges whether incomplete processing to read data from the database is in process when writing data into the database, issues the write inhibit command that inhibits the write of data into the storage unit in advance of issuing a write request if incomplete processing to read is in process, and issues the write release command that commands the restart of the data write into the storage unit after the completion of the incomplete processing to read and the ongoing data write processing.

11. A computer system comprising:

a host computer that executes transaction processing; and a storage sub-system, connected to the host computer, comprising a storage unit for storing a database to be accessed for transaction processing, a cache memory, and a storage control unit;

wherein the host computer comprises a means to issue read/write requests including an identifier to identify a transaction for which a request for access to the database has occurred when accessing the database for transaction processing and a means to command the storage sub-system to do commit processing when the transaction is completed; and wherein the storage control unit, in addition to controlling the storage unit, comprises a means to store data of write request into the cache memory in response to a write request issued from the host computer and notify the host computer of processing complete, a means to transfer the data that has been stored into the cache by the write requests occurred for the transactions so far completed into the storage unit in response to the command to do the commit processing, and a means to determine whether the storage unit or the cache memory retains the data to be transferred, in response to a read request issued from the host computer, based on the identifier included in the read request and transfer the data to the host computer, according to the result of determination.

* * * * *